United States Patent
Deyaf

(10) Patent No.: US 9,789,822 B2
(45) Date of Patent: Oct. 17, 2017

(54) MIRROR CONTROLLER UNIT FOR EMERGENCY VEHICLE WARNING DEVICES

(71) Applicant: Feniex Industries Inc., Austin, TX (US)

(72) Inventor: Hamza Deyaf, Austin, TX (US)

(73) Assignee: Feniex Industries, Inc., Austin, TX (US)

(*) Notice: Subject to any disclaimer, the term of this patent is extended or adjusted under 35 U.S.C. 154(b) by 39 days.

(21) Appl. No.: 14/919,727

(22) Filed: Oct. 22, 2015

(65) Prior Publication Data

US 2017/0113618 A1    Apr. 27, 2017

(51) Int. Cl.
| | |
|---|---|
| *B60Q 1/52* | (2006.01) |
| *B60Q 7/02* | (2006.01) |
| *B60R 1/12* | (2006.01) |
| *B60R 1/04* | (2006.01) |
| *B60C 9/00* | (2006.01) |
| *H04W 4/00* | (2009.01) |

(52) U.S. Cl.
CPC ............... *B60R 1/12* (2013.01); *B60C 9/00* (2013.01); *B60R 1/04* (2013.01); *H04W 4/008* (2013.01); *B60R 2001/1284* (2013.01)

(58) Field of Classification Search
CPC ..... B60R 1/12; B60R 1/04; B60R 2001/1284; H04W 4/008; B60Q 9/00

USPC .......................................................... 340/472
See application file for complete search history.

(56) References Cited

U.S. PATENT DOCUMENTS

| | | | | |
|---|---|---|---|---|
| 5,537,003 | A * | 7/1996 | Bechtel | H05B 37/0218 307/10.8 |
| 8,963,705 | B2 | 2/2015 | Miller et al. | |
| 2012/0229882 | A1* | 9/2012 | Fish, Jr. | B60R 1/025 359/267 |
| 2012/0287496 | A1* | 11/2012 | Nagel | G02F 1/163 359/267 |
| 2015/0086077 | A1* | 3/2015 | Du | G06K 9/00369 382/104 |
| 2015/0151725 | A1* | 6/2015 | Clarke | B60W 30/00 701/28 |

* cited by examiner

*Primary Examiner* — Tanmay Shah

(57) ABSTRACT

A mirror controller unit is disclosed herein for controlling an associated auxiliary vehicle warning device. In one embodiment, the mirror controller unit includes a set of selectors located on at least one edge of a mirror body. The mirror controller unit includes a reflective mirror surface. An auxiliary vehicle warning device that is physically attached to a surface of a vehicle may be connected via wires to the mirror controller unit and operated by the set of selectors disposed on the mirror controller unit. In another embodiment, a mirror controller unit is disclosed with an integrated touch screen for performing control functions on an associated auxiliary vehicle warning device.

6 Claims, 10 Drawing Sheets

MIRROR CONTROLLER UNIT FOR EMERGENCY VEHICLE WARNING DEVICES

BACKGROUND OF THE INVENTION (1) Field of the Invention

The illustrative embodiments are directed to controlling auxiliary vehicle warning devices, and more particularly, are directed to a method and apparatus for controlling warning lights and sirens using a mirror control unit located within a vehicle.

2. Background Art

Vehicles are often supplemented with auxiliary vehicle warning devices. Auxiliary vehicle warning devices serve many purposes. Auxiliary vehicle warning devices may provide flashing lights, warning lights, warning sirens, and other similar actions, which are useful for communicating to the general public observing the vehicle supplemented with such a device that the vehicle has a special purpose by virtue of its operator/driver. Accordingly, the auxiliary vehicle warning device may communicate to the general public that the vehicle associated with the auxiliary warning device may belong to police, firefighters, and other emergency responders including ambulances. Various government agencies also utilize auxiliary vehicle warning devices, as do construction crews and other maintenance and repair vehicles. Additionally, auxiliary vehicle warning devices are also commonly used by vehicle owners who individually are eager to increase the visual distinctiveness of their vehicles and also benefit from the features associated with an auxiliary vehicle warning device.

Auxiliary vehicle warning devices as used herein may include any device that is useful and attaches to a vehicle surface, including exterior and interior surfaces of a vehicle. More specifically, auxiliary vehicle warning devices encompass the visual and acoustic warning devices, such as warning lights and sirens, including emergency warning lights and sirens. Vehicle warning lights, including emergency vehicle warning lights, may be any supplemental lighting device that may be coupled to a surface of a vehicle. Vehicle warning lights frequently include light emitting diodes (LED) light because the light emitting diodes offer a considerable amount of brightness. In addition to visual warning devices and various lighting devices, auxiliary vehicle warning devices may further include acoustic warning devices. Acoustic vehicle warning devices may include, without limitation, sirens and speakers.

Vehicle warning lights and sirens are extremely popular and frequently seen on a variety of vehicles, as discussed above, including police, fire, emergency, and construction vehicles.

BRIEF SUMMARY OF THE INVENTION

In one or more embodiments described herein, a mirror unit for use in a vehicle is disclosed. In one embodiment, the mirror unit includes a mirror body, whereby the mirror body is disposed on a mirror positioning mount, wherein the mirror positioning mount is coupled to a front windshield of the vehicle on an interior surface of the front windshield. The mirror body includes a reflective mirror surface, wherein the mirror surface may serve as a rear view mirror in one or more embodiments.

Further, a set of selectors is disposed on at least one edge of the mirror body. The set of selectors are configured to perform a set of control functions on one or more auxiliary vehicle warning devices, wherein the one or more auxiliary vehicle warning devices are physically attached to a surface of the vehicle. The mirror unit with the integrated set of selectors may further include a processing unit that is located internally within the mirror body. The processing unit is configured to communicate input from the set of selectors to the one or more auxiliary vehicle warning devices.

In accordance with another embodiment disclosed herein, a mirror unit for use in a vehicle is described whereby the mirror unit further includes a touch screen. The mirror unit may include a touch screen that allows a user to select various applications and programs as shown on the screen menu of the touch screen. Further, the user may access a program for GPS in one or more embodiments. The mirror unit may also provide audiovisual recordings and access to images provided by a backup camera. The mirror unit may be positioned on a surface of a vehicle. In one or more embodiments, the mirror unit is positioned via a mirror positioning mount on a surface of a windshield of the vehicle. Further, the touch screen is configured to receive user input for performing a set of control functions on an associated auxiliary vehicle warning device, wherein the associated auxiliary vehicle warning device is physically attached to a surface of the vehicle.

In accordance with yet another aspect of the embodiments described herein, a system for controlling actions on an associated auxiliary vehicle warning device using a mirror unit located in a vehicle is provided herein. The system may comprise a mirror body disposed on a mirror positioning mount, wherein the mirror positioning mount is coupled to a front windshield of the vehicle on an interior surface of the front windshield. Additionally, a reflective mirror surface may be coupled to the mirror body. Further, a touch screen may be coupled to the reflective mirror surface, wherein the touch screen is configured to receive input for performing a set of control functions on an associated auxiliary vehicle warning device. The associated auxiliary vehicle warning device may be physically attached to the vehicle. Further, a controller may be disposed in the vehicle, wherein the controller includes a wireless transmitter that communicates with a wireless receiver disposed in the associated auxiliary vehicle warning device, and wherein the mirror unit is configured to transmit a set of control functions to the controller.

BRIEF DESCRIPTION OF THE DRAWINGS

The novel features believed characteristic of the invention are set forth in the appended claims. The illustrative embodiments, as well as a preferred mode of use, further objectives and advantages thereof, will best be understood by reference to the following detailed description when read in conjunction with the accompanying drawings, wherein:

DETAILED DESCRIPTION OF THE INVENTION

Figure 1:
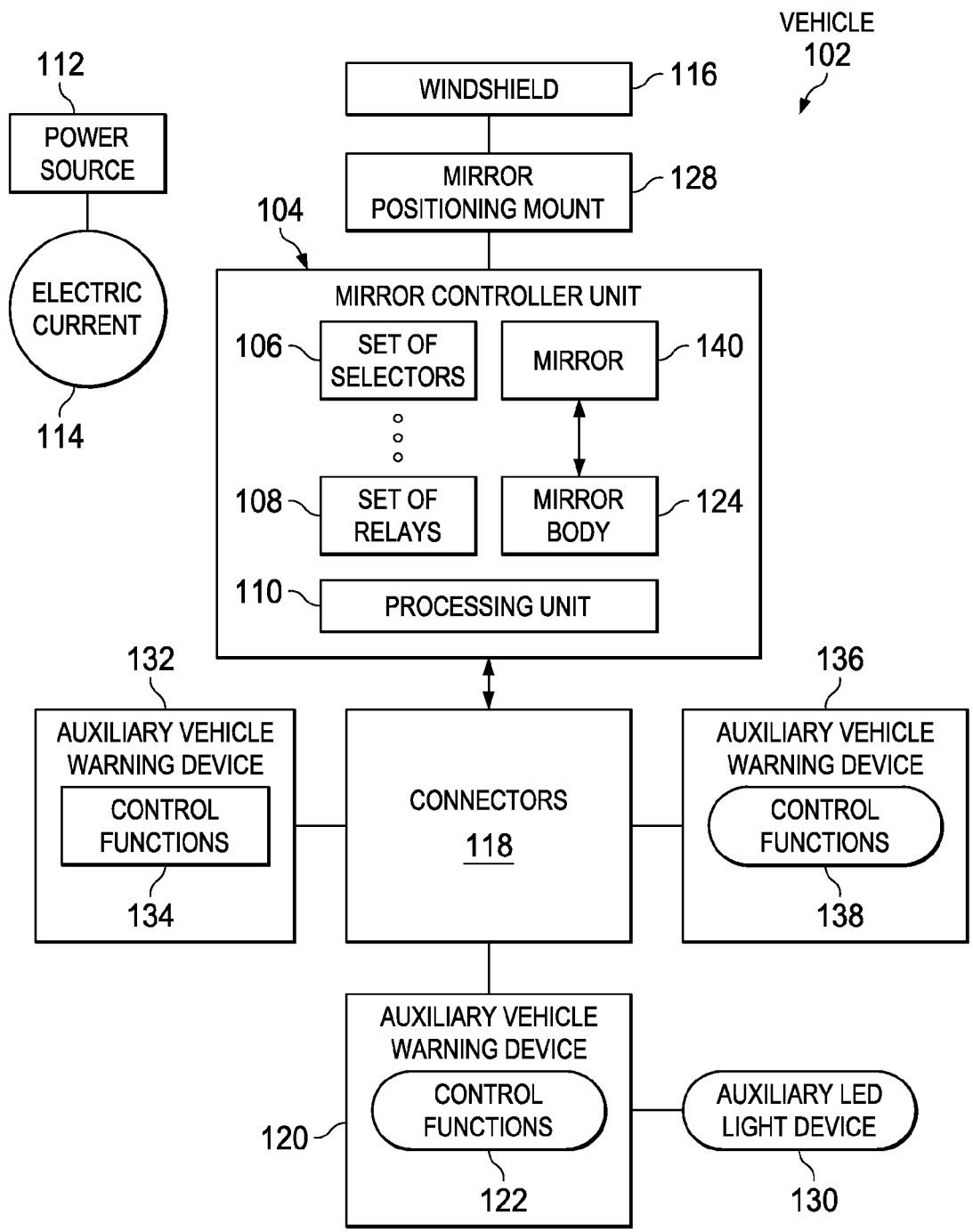
FIG. 1 is a block diagram of a mirror controller unit with a set of selectors for use with auxiliary vehicle warning devices in accordance with illustrative embodiments described herein.

The different illustrative embodiments recognize and take into account a number of different considerations. For example, operators of vehicles with auxiliary vehicle warning devices continue to experience problems with the installation of these auxiliary vehicle warning devices. Auxiliary vehicle warning devices are usually operated with controllers, whereby the controllers control a function or feature on the auxiliary vehicle warning device.

One drawback of installing an auxiliary vehicle warning device is that in order to connect these auxiliary vehicle warning devices to a power source, such as a car battery, several cords and wires must be run throughout the vehicle in order to attach the auxiliary vehicle warning devices to the power source. While there are technicians who may skillfully install these auxiliary vehicle warning devices so that their connecting wires and cables are relatively hidden within the confines and structure of the vehicle, such installation is often expensive due to the time-consuming and cumbersome nature of the installation process.

Typically, in order to install an auxiliary vehicle warning device, it is necessary to disassemble multiple parts of the vehicle in order to attach and wire the auxiliary vehicle warning device to the vehicle battery or other vehicle power source, such as a cigarette lighter. Upon completion of the installation and wiring process, it is necessary to reassemble each of the disassembled parts of the vehicle correctly.

While attempts are made to hide these cords and wires, depending on the placement of the auxiliary vehicle warning device, and the number of cords and wires there still may be undesirable cords and wires running from the auxiliary vehicle warning device to the power source and oftentimes through the dashboard and/or console area of a vehicle. These electrical wires are unsightly, cumbersome, and may distract the driver or passengers within the vehicle.

Additional wires and cords may also need to be accounted for due to the controllers associated with the auxiliary vehicle warning devices. As discussed above, these controllers are frequently disposed on the main console or dash area of a vehicle, which has limited space and may quickly become overcrowded with devices and device connections.

Accordingly, there exists a need for additional systems and methods of controlling auxiliary vehicle warning devices.

Rear view mirrors are a component of many automobiles and other vehicles. They may be mounted to a front windshield and may pivot around a mirror mount base to allow a driver to frequently adjust the angle of the reverse mirror. Rear view mirrors provide a reflective surface for the driver to visually assess his or her surroundings, particularly with respect to any action, movement, or scenery behind the body of the vehicle. Drivers are thus conditioned to look up at the rear view mirror both before the vehicle is turned on and during the driving and/or operation of the vehicle. The illustrative embodiments recognize that using the location of a reverse mirror and using a body of the rear view mirror to perform a control function on an auxiliary vehicle warning device is a useful and much needed alternative to conventionally available controllers.

As used herein, the term "set" may refer to a single item, as well as two or more items. Accordingly, the term "set" may indicate a single or plural amount of components depending on the context of the term. Further, the term "coupled to" may indicate a connection or attachment between surfaces of one object to another. As used herein the term "coupled" or "coupled to" may be either directly or indirectly connected. Additionally, as much as possible, like components utilize the same reference numerals throughout the description herein and in multiple Figures.

Turning to FIG. 1, FIG. 1 is a block diagram of a mirror controller unit in accordance with embodiments described herein. It one or more embodiments, mirror controller unit 104 is intended to function as both a rear view mirror and as a controller, particularly suited for auxiliary vehicle warning devices. More specifically, in one or more embodiments, mirror controller unit 104 is intended to perform a control function on auxiliary vehicle warning lighting devices that may be utilized with vehicles belonging to departments and individuals working in the field of police, fire, emergency, and construction.

Vehicle 102 may be any vehicle that may be associated with an auxiliary vehicle warning device. Vehicle 102 may include at least two or more distinct tires, and often will have at least four tires. Vehicle 102 may include automobiles of any make and model, as well as may include motorcycles and other two wheeled motorized transportation vehicles. In some embodiments, vehicle 102 may further include non-motorized bicycles.

In one or more embodiment, vehicle 102 may be particularly suited for an emergency response vehicle. An emergency response vehicle may be a law enforcement vehicle, a fire department vehicle, an emergency medical vehicle, a public utility vehicle, a tow truck, construction vehicle, or other type of emergency vehicle.

A law enforcement vehicle is a vehicle utilized by a law enforcement agency or organization, such as, but without limitation, a police car, a SWAT van, search and rescue vehicle, or any other vehicle utilized by the police department, a sheriff's department vehicle, U.S. Marshal Service vehicle, or any other law enforcement vehicle.

An emergency medical vehicle is a vehicle for transporting a sick or injured person. An emergency medical vehicle may be, for example, an ambulance. A fire department vehicle is a vehicle utilized by a fire department. A fire department vehicle may be, for example, a fire truck. A public utility vehicle is a vehicle used by a utility, such as the water department, an electric power utility provider, a gas utility provider, and other public works vehicles. A tow truck is a vehicle for towing one or more other vehicles. A tow truck may also be referred to as a wrecker. All of these examples include above may be examples of vehicle 102 and may incorporate the methods and systems as discussed herein.

Accordingly, vehicle 102 may include mirror controller unit 104, which further includes mirror 140. Mirror controller unit 104 is intended to be coupled to a surface of vehicle 102. Mirror 140 is a reflective surface that reflects the surrounding environment of vehicle 102.

In one embodiment, mirror 140 includes a structure body shown schematically in FIG. 1 as mirror body 124. In some embodiments, mirror body 124 may be encased by another structure, referred to herein as a housing. The housing is intended to be a surrounding structure formed of protective and durable material that fits the shape of mirror 140 and may provide a thicker structure surrounding mirror 140 than as provided by mirror body 124. In some embodiments, an additional housing may not be necessary when the structure and design of mirror body 124 may provide enough protection so that that the housing is redundant to mirror 140.

One of ordinary skill in the art may design mirror body 124 to have straight or curved, e.g. beveled edges. Mirror 140 has a reflective surface. In one embodiment, mirror 140 is intended to function as a rear view mirror. As understood in the art, a rear view mirror may be a mirror in automobiles and other vehicles, designed to allow the driver to see rearward through the vehicle's rear windshield. In one or more embodiments, mirror 140 is coupled to an interior surface of a front windshield of vehicle 102. However, in alternative embodiments, windshield 116 may be coupled to a rear windshield of vehicle 102. Further, in some embodiments, a user of mirror 140 may choose to install mirror 140 to function as side mirrors of vehicle 102, such that mirror 140 is coupled to a side of vehicle 102 and/or handlebars of vehicle 102. For example, bicycles and motorcycles oftentimes do not include a front windshield. Accordingly, such cases may necessitate that mirror 140, as located in mirror controller unit 104, be attached to a side of vehicle 102 so as to function as a side mirror. Accordingly, one of ordinary skill may envision that mirror 140 may be positioned on various locations of vehicle 102 to best suit the needs of the driver of vehicle 102.

In one or more embodiments, mirror positioning mount 128 may be used to affix mirror body 124 to a surface of a vehicle 102. In one or more embodiments, mirror positioning mount 128 may include a base portion to be fixed on a surface of vehicle 102. Mirror positioning mount 128 may further include a movable portion attached to the base portion so as to adjust a position of mirror body 124. In one or more embodiments, mirror positioning mount 128 may include attachment means that fits over an existing mounting unit intended to couple to a mirror body, such as a rear view mirror mount already existing in a vehicle. In another alternative, mirror positioning mount 128 may be installed directly on a surface of vehicle 102, including windshield 116.

Accordingly, the different illustrative embodiments recognize and take into account that installing auxiliary vehicle warning devices is necessary for these emergency vehicles to function and save lives in responding to emergencies and serving their communities. Emergency response vehicles utilize sirens and lights to communicate to the general public their oncoming approach or to signal for other drivers to pull over or while in transit to and from an emergency.

In one or more embodiments, auxiliary vehicle warning device 120 may be any device with a set of control functions useful to a vehicle. Furthermore, auxiliary vehicle warning device 120 is attached to vehicle 102 by attachment means that may include fastening, bolting, welding, adhering and similar means for attaching auxiliary vehicle warning devices 120 to vehicle 102. Auxiliary vehicle warning device 120 is intended to be coupled to or communicating with one or more surfaces of vehicle 102 via at least one point of physical contact between the surface of vehicle 102 and the body of auxiliary vehicle warning device 120. As pictured in FIG. 1, auxiliary vehicle warning device 120 is a single device. However, in other embodiments, vehicle 102 may comprise several auxiliary vehicle warning devices that all may be coupled to mirror controller unit 104. It is intended that mirror controller unit 104 be operable with one or more auxiliary vehicle warning devices, such as auxiliary vehicle warning device 120.

The term "auxiliary" may mean also interchangeably be described as "supplemental" or "additional". Auxiliary vehicle warning device 120 may thus be any device that is supplemental or added to vehicle 102, and in particular, is intended to refer to auxiliary vehicle warning devices that perform control functions useful for vehicles belonging to the police, fire, emergency, and construction industries. Auxiliary vehicle warning device 120 may further be located either on an exterior or interior surface of vehicle 120.

In one or more embodiments, auxiliary vehicle warning device 120 may be auxiliary vehicle light emitting device 130. Additionally in one or more embodiments, auxiliary light emitting device 130 may include "LED" lights. Auxiliary vehicle light emitting device 130 may be a supplemental LED light or emergency warning LED light that a user may attach to an interior or exterior of a vehicle. Examples of auxiliary vehicle LED lights include, for example and without limitation, a LED dash light, a LED deck light, an emergency LED light bar, a beacon LED light, a LED hideaway light, a LED visor light, a LED mini light bar, and other add-on emergency LED warning light and supplemental vehicle LED lights. Auxiliary vehicle light emitting device 130 may include a range of flash patterns for the lights embedded in auxiliary vehicle light emitting device 130.

Accordingly, set of control functions 122 is one or more control function that controls an operation of auxiliary vehicle warning device 120. Set of control functions 122 may also be described as an action or an output action responsive to an input provided to auxiliary vehicle warning device 120. Set of control functions 122 may include the control function for turning on or off auxiliary vehicle warning device 120. Further, set of control functions 122 may include selecting a particular feature of auxiliary vehicle warning device 120.

Set of control function 122 may be any function of an auxiliary vehicle warning device 120 including, but not limited to activating the auxiliary vehicle warning device and deactivating the auxiliary vehicle warning device. When auxiliary vehicle warning device 120 is auxiliary light emitting vehicle device 130, set of control functions 122 may further include, without limitation, changing a strobe pattern of the set of lights associated with the auxiliary vehicle warning device 130, changing a luminosity of the set of lights, changing a frequency of flashing of one or more lights in the set of lights, and changing a color pattern of the set of lights of auxiliary vehicle light emitting device 130.

In one or more embodiments, auxiliary vehicle warning device 120 may include an acoustic or audible warning device, such as a siren. In such embodiments, the set of control functions 122 may further include, without limitation, activating or deactivating the siren to produce a siren tone. Such tones may include, without limitation, Wail, Yelp, Phaser, Hi-Lo, Horn, Fast Yelp, and Manual Wail. Such tones provided varying sounds that the driver of vehicle 102 may find suitable for communicating warning sounds under various conditions and circumstances.

In one or more embodiments, an operator of vehicle 102 may also install an auxiliary speaker with his or her car, such that speaker may function in accordance with auxiliary vehicle warning device 120. In such embodiments, a speaker may be used to amplify or enhance sounds produced from a siren. Accordingly, a siren attached to a surface of vehicle 102 may also be paired to function with one or more speakers to enhance the sound output from the siren. In such embodiments, set of control functions 122 may further include activating or deactivating a speaker associated with a siren. Furthermore, a speaker may be utilized for outputting sound from a CB (citizens band) radio that is also installed within a vehicle.

Figure 2:
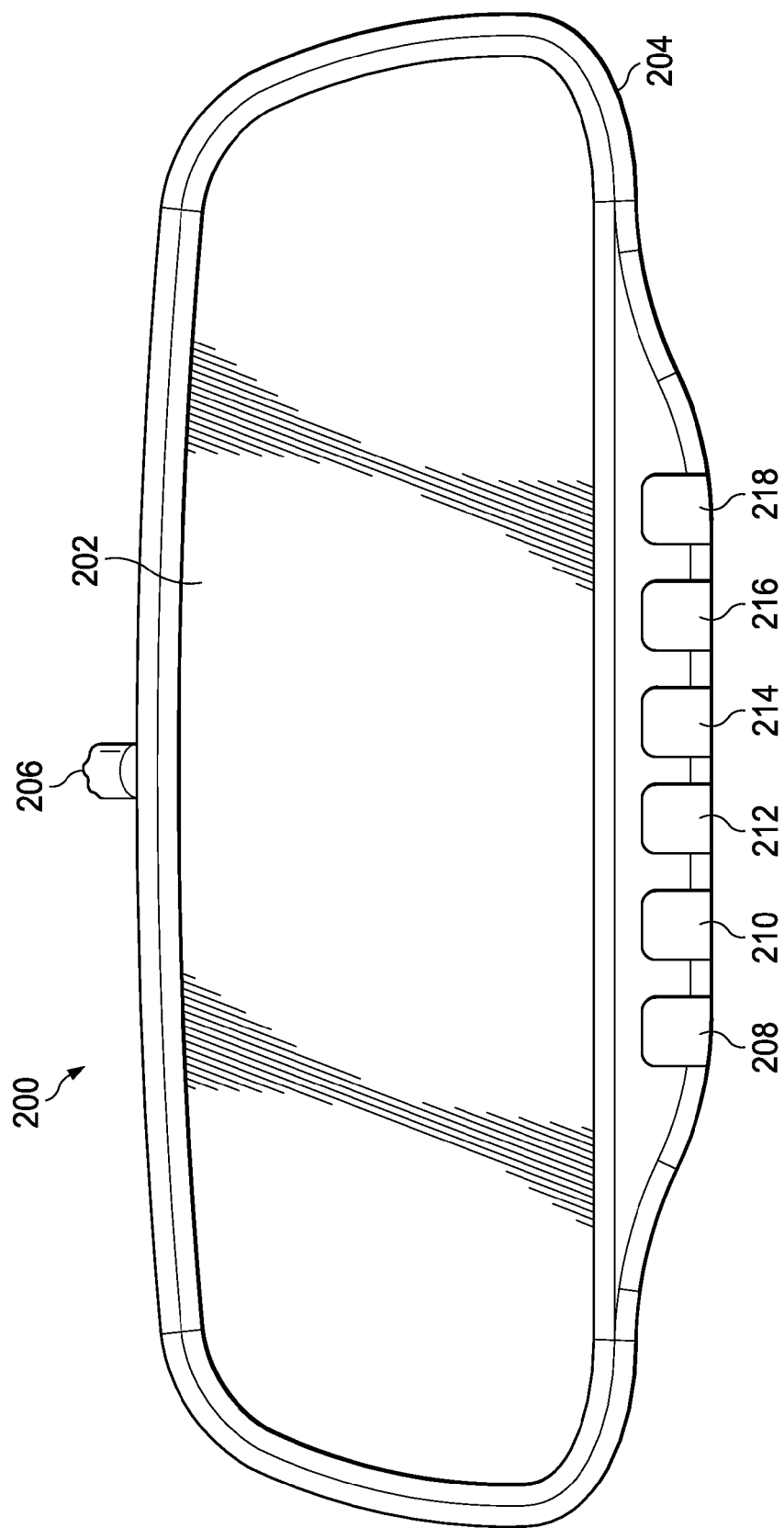
FIG. 2 is an illustration of a front view of mirror controller unit with a set of selectors for use controlling an auxiliary vehicle warning device in accordance with illustrative embodiments described herein.

FIG. 2 further includes auxiliary vehicle warning device 132 and auxiliary vehicle warning device 136. Each auxiliary vehicle warning device 132 and auxiliary vehicle warning device 136 has a set of control functions shown as set of control functions 134 and set of control functions 138. Accordingly, it is intended that mirror control unit 104 may be operable with one or more auxiliary vehicle warning device, so that a driver of vehicle 102 may utilize mirror control unit 104 to perform a control function on more than one auxiliary vehicle warning device that is physically attached or physically coupled to vehicle 102. For example, auxiliary vehicle warning device 120 may be a siren and auxiliary vehicle warning device 132 may be a speaker, both of which are attached to a surface of vehicle 102. Furthermore, in one or more embodiments, it is intended that mirror controller unit 104 control a light emitting device and a siren, whereby light emitting device may be auxiliary vehicle warning device 120 and siren may be auxiliary warning vehicle device 136.

Mirror controller unit 104 is shown as having set of selectors 106. Set of selectors 106 may be coupled to an edge or side of mirror body 124. In one or more embodiment, set of selectors 106 may be a set of switches, knobs, buttons including push buttons, or other type of switch that functions as an initiation point for a user to perform a control function on an associated auxiliary vehicle warning device, such as auxiliary vehicle warning device 120, 132, or 136. Set of selectors 106 may further be backlit so as to indicate visually to a user when any selector from among set of selectors 106 is activated.

In one or more embodiments, set of selectors 106 may be further located on a housing, seen as housing 126. It is intended that set of selectors 106 may be located on least one or more edges of mirror body 124. Set of selectors 106 may all be located on one edge or side of mirror body 124. Further, in one or more embodiments, set of selectors 106 may be integrated with mirror 104 as "touchless keys".

Set of selectors 106 have a front side that is visible to a user such that user may contact set of selectors 106 in order to perform a resulting control function on an associated auxiliary vehicle warning device. In one or more embodiments, labels may be coupled to the front side of set of selectors 106 for a user to be able to tell by looking at the selector among set of selectors 106 which control function has been associated with each selector. The labels may include text and/or a symbol that indicates which control function is controlled by each selector.

On a rear side of set of selectors 106, a surface of set of selectors 106 may be coupled with set of relays 108. Set of relays 108 encompasses relays for connecting to processing unit 110. Set of relays 108 are intended to be relays, which as understood by one of ordinary skill in the art, may function as an electrically operated switch. Relays are essentially an electrical device that is activated by a current or signal in one circuit to open or close another circuit. Many relays use an electromagnet to mechanically operate a switch, but other operating principles may also be used, such as solid-state relays, which are known to one of ordinary skill in the art. Relays are used where it is necessary to control a circuit by a low-power signal (with complete electrical isolation between control and controlled circuits), or where several circuits must be controlled by one signal. Accordingly set of relays 106 may encompass many types of relays and configurations as understood in the art.

In one or more embodiments, processing unit 110 is a microprocessor. In such embodiments, processing unit 110 may be a processor that incorporates the functions of a computer's central processing unit (CPU) on a single integrated circuit (IC) or at most a few integrated circuits. Thus, processing unit 110 may function as a multipurpose, programmable device that accepts digital data as input, processes it according to instructions stored in its memory, and provides results as output. Thus, processing unit 110 has internal memory for storing a set of instructions. Processing unit 110 may be a processing unit that is embedded in mirror body 124 and in one or more embodiments, housing 126. In such an embodiment, housing 126 may contain processing unit 110, set of relays 108, and mirror 140. One of ordinary skill may incorporate additional components as needed for operating processing unit 110 in accordance with the embodiments described above.

Connectors 118 are intended to be connectors that connect auxiliary vehicle warning device 120 to mirror controller unit 104. Further, connectors 118 connect auxiliary vehicle warning device 132 and 136 to mirror controller unit 104. Connectors 118 may include, without limitation, cables and/or wires for connecting auxiliary vehicle warning devices to mirror controller unit 104. Thus mirror controller unit 104 is wired to a set of auxiliary vehicle warning devices for performing set of control functions on the set of auxiliary vehicle warning devices.

In one embodiment, connectors 118 may be joined, i.e. connected, with wires running from the back of mirror controller unit 104. In such an embodiment, connectors 118 through one or more wires that also connect to processing unit 110 provide for the input provided to set of selectors 106 to be transmitted to the respective auxiliary vehicle warning device, i.e. 120, 123, and 136.

It may be necessary to drill into a body of vehicle 102 so as to run connectors 118 from mirror controller unit 104 to one or more auxiliary vehicle warning device. One of ordinary skill in the art may be able to install an auxiliary vehicle warning device and run connectors 118 to mirror controller unit 104 by drilling into a body of vehicle 102 with minimal alterations to the body of vehicle 102. As well, any such connectors 118 may be disguised with electrical tape and/or insulated so that they are not visually disruptive to a driver of vehicle 102.

In order to activate auxiliary vehicle warning devices, auxiliary vehicle warning devices must receive electric current 114. In one or more embodiments, mirror controller unit 104 is coupled to power source 112. In one or more embodiments, power, i.e. electric current 114, may be transmitted through connectors 118 to any connected auxiliary vehicle warning devices, such as auxiliary vehicle warning device 120, 132, and 136, without limitation thereof. In alternative embodiments, each auxiliary vehicle warning device may be coupled to power source 112 in addition to being coupled to mirror controller unit 104, whereby mirror controller unit 104 is also connected to power source 112. Accordingly, power source 112 may be coupled to either mirror controller unit 104 or an attached auxiliary vehicle warning device, such as 120, 132, and 136, or both depending on the most suitable arrangement of connecting as determined by one of ordinary skill in the art.

Power source 112 is intended to be any power source supplying the direct electric current 114. In one embodiment, power source 112 is a single battery, such as the vehicle battery. In another embodiment, the power source 112 may be a solar panel for generating an electric current using solar power, or any other source of electric power. In still another embodiment, the power source 112 may include two or more batteries. In still another embodiment, the power source 112 may include a set of batteries and a set of solar panels working in conjunction to supply the direct electric current 114.

It is an objective of the present invention to provide for a mirror controller unit, such as mirror controller unit 104, that may be used to control one or more auxiliary vehicle warning devices, including device 120, 132, and/or 136. Auxiliary vehicle warning devices typically include one or more controllers that must be installed usually to an interior surface of a vehicle. The space available for installing any such controllers in a vehicle may be very limited. This is especially true for vehicles used by industries such as police, fire, emergency, and also construction. In such vehicles, there are presently not enough options available regarding controllers and their installation and method of operation to account for the challenges associated with installing and operated presently available controllers.

In such vehicles, the number of auxiliary vehicle warning devices may be one or more and locating the relevant associated controllers in the vehicle is difficult to due to the limited space available next to a driver of a vehicle. Accordingly, a mirror controller unit, such as mirror controller unit 104 is provided herein whereby mirror controller unit 104 functions as both a mirror with a reflective surface and further includes a set of selectors, such as set of selectors 106, for performing a control function on an associated auxiliary vehicle warning device. The mirror controller unit 104 is intended to be associated with at least one auxiliary vehicle warning device, whereby the auxiliary vehicle warning device is attached via various attachment means to a surface of vehicle 102.

In one or more embodiments, mirror controller unit 104 may further be programmed to operate other electrical devices not permanently attached to vehicle 102. However, even with such embodiments as described above, at least one or more selectors from set of selectors 106 is paired to control an auxiliary vehicle warning device that is physically attached via various attachment means to a surface of vehicle 102.

In accordance with embodiments described above, selecting a selector from a set of selectors 106 transmits an input instruction to processing unit 110. After processing the input instruction to processing unit 110, the processing unit 104 interprets the instruction provided from set of selectors 106 and transmits the instruction as an associated control function from a set of control functions 122 for auxiliary vehicle warning device 120, or set of control functions 134 for auxiliary vehicle warning device 132, or set of control functions 138 for auxiliary vehicle warning device 136. Thus, a corresponding output action from one of the auxiliary vehicle warning devices is caused by the selection made by set of selectors 106 located on at least one edge of mirror controller unit 104.

Turning to FIG. 2, FIG. 2 is an elevation view of a front side view of a mirror controller unit in accordance with embodiments described herein. Mirror controller unit 200 is intended to be located on a surface of a vehicle. Mirror controller unit 200 as pictured in FIG. 2 may be a mirror controller unit in accordance with the description provided above for mirror controller unit 104, including all of the elements and limitations described above for mirror controller unit 104. Therefore, even though FIG. 2 does not show the following components, in one or more embodiments, mirror controller unit 200 includes a processing unit, such as processing unit 110, set of relays 108, and is coupled to a power source, such as power source 112.

Mirror controller unit 200 includes mirror 202, which functions as a reflective surface that mirrors the surrounding environment that mirror 200 is oriented in front of. In one embodiment, mirror controller unit 200 is affixed to an interior surface of a front windshield of a vehicle. Mirror controller unit may be affixed via mirror positioning mount 206. Further, in one embodiment, mirror controller unit 200 may be affixed to be located substantially in the top section of the front windshield and at or substantially near the center of the front windshield. Such a placement may be useful for any drivers to both adjust mirror body 204 to an angle most suitable for viewing the rear view of a vehicle, as well as for selecting any of selectors 208, 2010, 212, 214, 216, and 218.

Selectors 208, 210, 212, 214, 216, and 218 are shown in FIG. 2 as being all located on the same lower edge of mirror controller unit 200. As seen in FIG. 2, mirror body 204 includes a protective housing whereby selectors 208, 210, 212, 214, and 218 are located on the same lower edge of this protective housing. In one or more embodiments, selectors 208, 210, 212, 214, and 218 may be divided up so that some selectors are located on one edge and the remaining set may be located on another edge of mirror controller unit 200. In such embodiments, the selectors may be disposed on more than edge of mirror controller unit 200. Further, as previously discussed, selectors may be integrated on the side of mirror 202 as physical switches actually disposed on a surface of mirror 202 or as "touchless" keys.

In accordance with the embodiments described above, selectors 208, 210, 212, 214, 216, and 218 may be connected to auxiliary vehicle warning devices in order to perform one or more control functions on one or more auxiliary vehicle warning devices.

Selectors 208, 210, 212, 214, 216, and 218 are shown to be push buttons in FIG. 2. A user may make a selection by making physical contact with button 208, 210, 212, 214, 216, 218. Usually, a user will use one of his or her fingers but may also use a stylus, pen, or similar device for pressing down on the front surface of selector 208, 210, 212, 214, 216, or 218.

There are a couple of different options for configuring the set of selectors as seen on mirror controller unit 202. If the user so desires, each selector shown in FIG. 2 may correspond to a control function associated with a single auxiliary vehicle warning device. In an alternative embodiment, the user may desire to have only some of the selectors shown in FIG. 2, when selected, perform a control function on one auxiliary vehicle warning device and then have one or more selectors perform a control function on a second auxiliary vehicle warning device. For example, selector 208 may be used to activate a light bar that is physically attached to a roof of a vehicle that includes mirror controller unit 200.

Next, selector 210 may be used to change a frequency of flashing of one or more lights integrated with the light bar. Selector 212 may be used to in the set of lights to change a color pattern of the set of lights integrated with the light bar.

If a user so desires, selector 214, 216, and 218 may be coupled to a different auxiliary vehicle warning device, to perform a set of control functions on the second auxiliary vehicle warning device. Thus, if the second auxiliary vehicle warning device is a siren, selector 214 may be connected to the siren so as to produce tones from among a set of tones associated with the siren. Selector 216 and 218 may be selected to activate and deactivate the siren. Thus, mirror controller unit 200 acts as both a rear view mirror as well as includes integrated switches for controlling auxiliary vehicle warning devices associated with the vehicle.

While FIG. 2 shows six selectors 208, 210, 212, 214, 216, and 218, any number of selectors may be incorporated along one edge or several edges of mirror body 204. In one or more embodiments, at least six to eight selectors are included with mirror body 204, however, more or less than this amount may be provided for to best suit the needs of user and provided alternative models of mirror controller unit 200.

Figure 3:
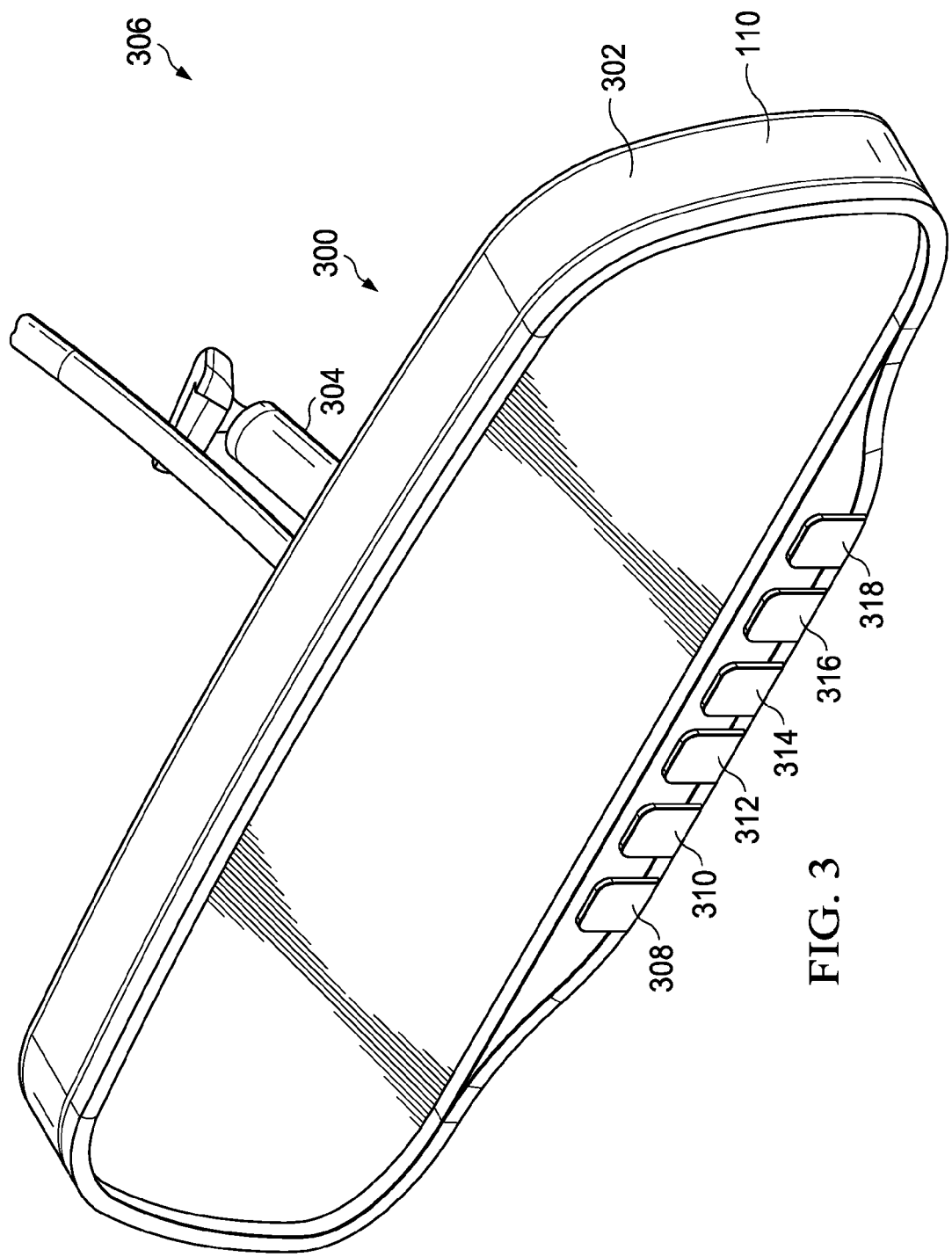
FIG. 3 is an illustration of a perspective view of a mirror controller unit with a set of selectors in accordance with illustrative embodiments described herein.

FIG. 3 shows a perspective view of a mirror controller unit in accordance with embodiments discussed herein. In FIG. 3, mirror controller unit 300 is attached to a surface 306 of a vehicle via mirror positioning mount 304. FIG. 3 includes set of selectors 308, 310, 312, 314, 316, and 318 which may used for performing a control function on one or more associated auxiliary vehicle warning devices. Processing unit 110 as shown and described in FIG. 1 may be integrated in the mirror body 302 of mirror controller unit 300.

Figure 4:
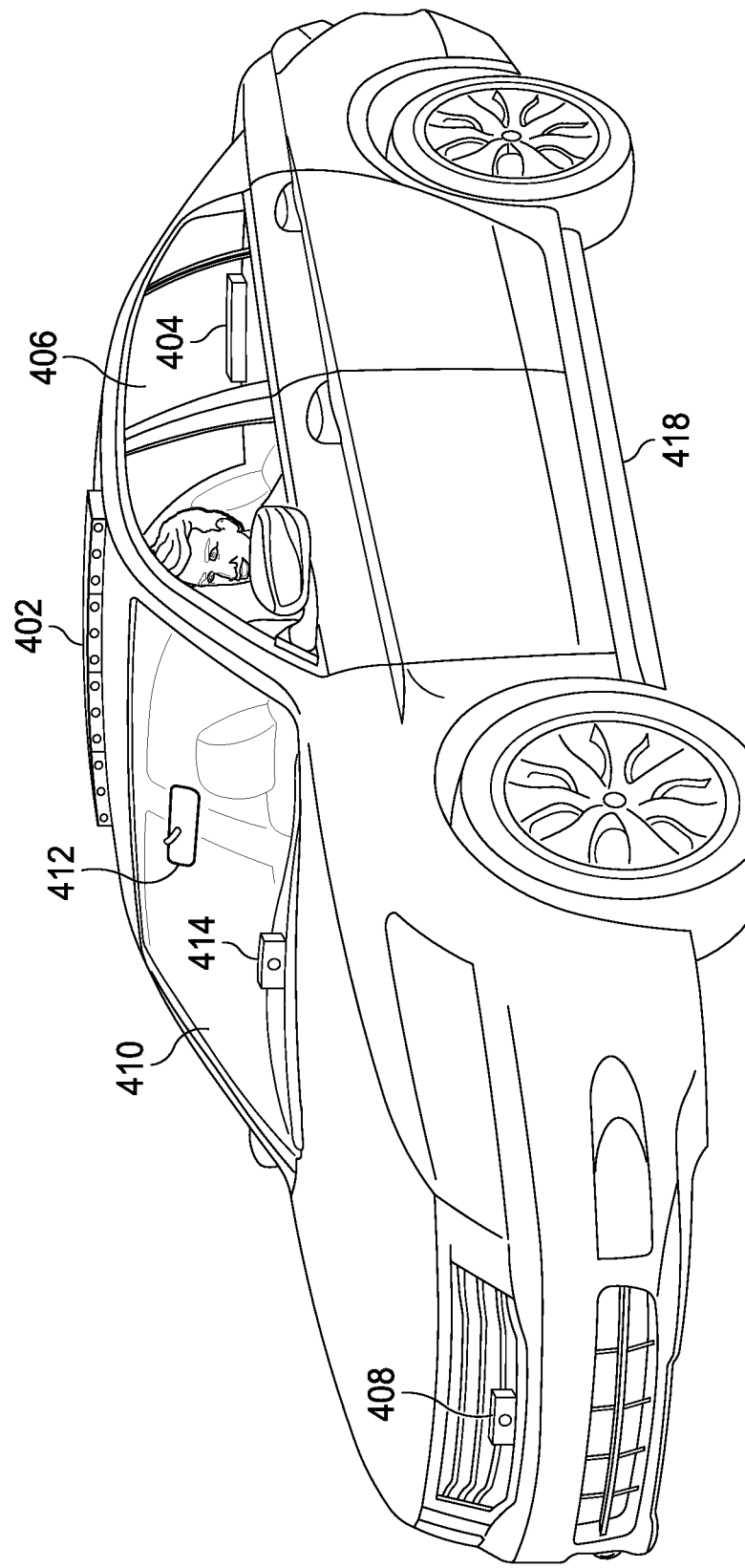
FIG. 4 is pictorial illustration of a vehicle with auxiliary vehicle warning devices controlled by a mirror controller unit with integrated selectors in accordance with illustrative embodiments described herein.

FIG. 4 is a pictorial view of a vehicle that includes a mirror controller unit in accordance with embodiments described herein. In FIG. 4, vehicle 418 may be an automobile that has been retrofitted to include auxiliary vehicle waning device 402, auxiliary vehicle warning device 404, and auxiliary vehicle warning device 408. As pictured in FIG. 4, auxiliary vehicle warning device 402, 404, and 408 are intended to emit light at various shades of brightness, colors, frequencies, and patterns to assist the driver of vehicle 418 in notifying the general public of the special purpose of vehicle 418. In one or more embodiments, vehicle 418 may be used in association with members of the police, fire, emergency, or construction industries.

Mirror controller unit 412 is shown affixed to front windshield 410 of vehicle 418. When user selects a selector from the set of selectors integrated on an edge of mirror controller unit 412, an associated control function may be performed on any one of auxiliary vehicle warning devices 402, 404, and 408. As shown in FIG. 4, auxiliary vehicle warning devices may be physically attached at separate locations on either the exterior or interior of vehicle 418. Auxiliary vehicle warning device 402 is intended to illustrate an LED light bar, as known to one of ordinary skill in the art. Additionally, auxiliary vehicle warning device 404 is intended to be a LED deck light, which is a vehicle light emitting device, and is mounted on a rear dash board of vehicle 418, facing the rear windshield 406 of vehicle 418. Further, the grill of vehicle 418 includes a grille light shown as auxiliary vehicle warning device 408. Each selector located on mirror controller unit 412 may perform a control function on any of auxiliary light emitting vehicle devices 402, 408, and 404. It is considered beneficial and an advantage offered by the present invention that the driver of vehicle 418 may operate one or more auxiliary vehicle warning devices from mirror controller unit 412, which also functions as a rear view mirror. It is noted that any wires or connections originating from auxiliary vehicle warning devices 402, 404, and 408 may be hidden by one of ordinary skill in the body and/or fabric or other material covering the body of vehicle 418 upon installation of these devices.

Thus, the above-described embodiments provide for a mirror controller unit to perform a control function. In one or more embodiments, it is intended that mirror controller unit described in FIGS. 1-4 may be able to completely replace other control boxes conventionally associated with auxiliary vehicle warning devices. In alternative embodiments, additional control boxes may be utilized in addition to a mirror controller unit in accordance with embodiments described herein.

Figure 5:
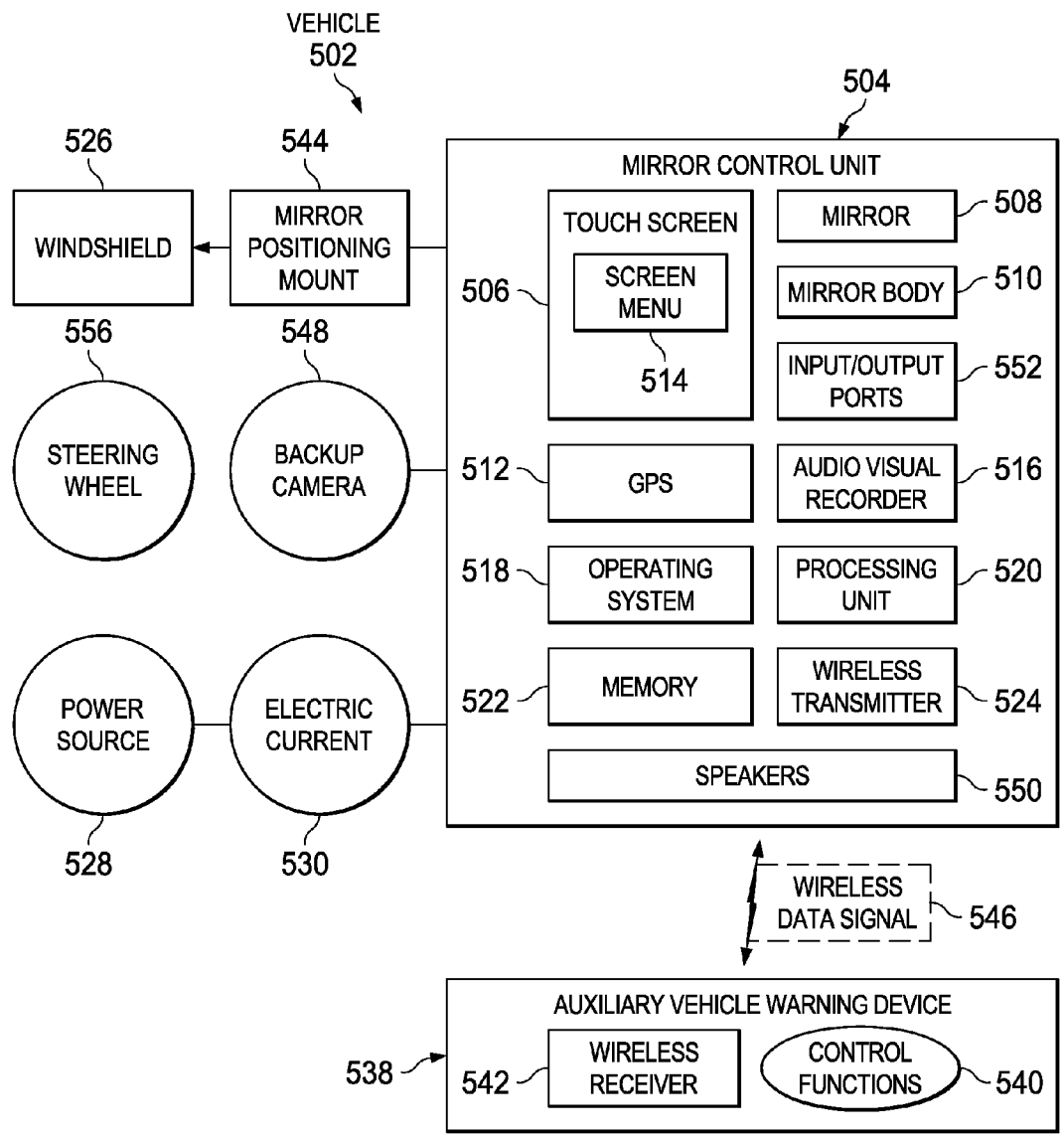
FIG. 5 is a block diagram of a mirror controller unit with an integrated touch screen in accordance with illustrative embodiments described herein.

Turning to FIG. 5, FIG. 5 is a block diagram of components for a mirror controller unit with a touch screen in accordance with embodiments described herein. FIG. 5 includes mirror controller unit 504, which in accordance with embodiments described herein, may be used to control a set of auxiliary vehicle warning devices, such as auxiliary vehicle warning device 538. Mirror controller unit 504 further incorporates mirror 508 formed on mirror body 510. Mirror controller unit 504 is intended to be used with a vehicle 502, whereby vehicle 502 may be any type of vehicle as discussed above with reference to vehicle 102.

Accordingly, vehicle 502 may be implemented as an automobile, truck, van, ambulance, sport utility vehicle (SUV), fire truck, construction vehicle, tow truck, or any other type of vehicle. In one or more embodiments, vehicle 502 may be particularly suited as an emergency vehicle operated by police, fire, and emergency responders. Further, vehicle 502 may be particularly suited for use with construction crews and also government agency vehicles.

Mirror 508 is a reflective surface, which may be used as a reflective surface that mirrors the surrounding environment that mirror 508 is oriented in front of. In one embodiment, mirror controller unit 504 is affixed to an interior surface of a front windshield of a vehicle, which may be windshield 526. Mirror controller unit may be affixed via mirror positioning mount 544, which is similar to mirror positioning mount 128 described above in FIG. 1. Further mirror controller mount 544 may be affixed to be located substantially in the top section of the front windshield and at or substantially near the center of the front windshield. Such a placement may be useful for any drivers to both adjust the mirror body 510 to an angle most suitable for viewing the rear view of a vehicle, as well as for making any of selections using touch screen 506.

Auxiliary vehicle warning device 538 may be any device with a set of control functions useful to a vehicle. Furthermore, auxiliary vehicle warning device 538 is attached to vehicle 502 by attachment means that may include fastening, bolting, welding, adhering or any other suitable means for attaching auxiliary vehicle warning devices 120 to vehicle 102 as understood by those of ordinary skill in the art. Auxiliary vehicle warning device 538 is intended to be coupled to or communicating with one or more surfaces of vehicle 502 via at least one point of physical contact between the surface of vehicle 502 and the body of auxiliary vehicle warning device 538.

While FIG. 5 shows schematically a single auxiliary vehicle warning device 538, it is intended that mirror controller unit 504 may be operable with one or more auxiliary vehicle warning device, which like auxiliary vehicle warning device 538, is coupled to a surface of vehicle 502. Auxiliary vehicle warning device 538 may include a light emitting device as is commonly used by police, fire, emergency, and construction crews. Further, auxiliary vehicle warning device 538 may include an acoustic warning device such as a siren.

In one or more embodiments, power source 528 is coupled to mirror controller unit 504. Power source 528 is intended to be any power source supplying the direct electric current 530. In one embodiment, power source 528 is a single battery, such as the vehicle battery usually existing in vehicle 502 and provides power to the several electrical components of vehicle 502. In another embodiment, the power source 528 may be a solar panel for generating an electric current using solar power, or any other source of electric power. In still another embodiment, the power source 528 may include two or more batteries. In still another embodiment, the power source 528 may include a set of batteries and a set of solar panels working in conjunction to supply the direct electric current 530. A cigarette lighter as located in vehicle 502 may further be used to transmit electric current 530 from vehicle 502.

In one or more embodiments, mirror controller unit 504 includes touch screen 506. Touch screen 506 may be an input device layered on the top of an electronic visual display of mirror controller unit 504. Processing unit 528 incorporates the information processing system that includes the instructions for operating touch screen 506. Touch screen 506 allows a user to give input or control the functions of mirror controller unit 504 through simple or multi-touch gestures by touching the screen with a special stylus/pen and-or one or more fingers. Touch screen 506 allows a user to interact directly with what is displayed, rather than using a mouse or intermediate device (other than a stylus). In one embodiment, touch screen 506 may be an LCD (liquid crystal display) screen, and may be either capacitive or resistive.

It is intended that touch screen 506 may allow a user to directly control any components working in conjunction with mirror controller unit 504. When activated, touch screen 506 may appear to a user as if touch screen is on the surface of mirror 508. In one or more embodiments, touch screen 506 is centrally located in mirror 508. In alternative embodiments, touch screen 506 may be located substantially to a far right hand side or a far left hand side of mirror 508. A user may be allowed to select the desired placement of touch screen 506 on mirror 508.

Mirror controller unit 504 may further include selectors 550, whereby selectors 550 may be integrated on at least one or more edges of mirror controller unit 504. Selectors 550 may be manual push buttons, toggle switches, and/or any other type of input device enabling a user to select or enter the desired user input into the mirror controller unit 504. Selectors 550 are included so as to allow functions such as turning on and off the mirror controller unit 504 or increasing or decreasing a brightness of a screen menu 514. Further functions may be associated with selectors 554 by one of ordinary skill.

As shown in FIG. 5, mirror controller unit 504 further incorporates one or more technologies related to audio visual recorder 516, GPS 512, and a backup camera 528. In one or more embodiments, global positioning system (GPS) 512 may be used to indicate a geographic location of both a user and an intended destination. GPS 512 may be a feature that a user may select using screen menu 514 on touch screen 506.

Further, mirror controller unit 504 may include one or more audio-visual recorder, seen as audio-visual recorder 516. Audio-visual recorder 516 may be incorporated to be a forward facing camera and video recorder. Accordingly, when touch screen is activated, audio visual recorder 516 may either automatically or manually selected to record and take pictures. Audio visual recorder 516 may be recess mounted in a cavity of mirror controller unit 504 intended for holding audio visual recorder 516. Speakers 550 may be included in one or more embodiments of mirror controller unit 504 for projecting any audio or sound transmitted from audiovisual recorder 516 directly out of mirror controller unit 504.

In one or more embodiments, mirror controller unit 504 is capable of receiving images from back up camera Back up camera 548 may be incorporated in a rear portion of vehicle 502. Typically, back up cameras similar to back up camera 548 are positioned on an underside of the rear portion of vehicle 502, so that a user is enabled to view the surroundings behind vehicle 502. Back up camera 548 allows a user to be aware of any vehicles, pedestrians, or any objects located behind vehicle 502 so that a user may navigate around them and avoid any collisions when vehicle 502 is being operated in reverse. Backup camera 548 may be located on a body of vehicle 502 separate from mirror controller unit 504.

Processing unit 528 is configured to act as a processing unit for implementing instructions and operating mirror controller unit 504 in accordance with embodiments described herein. In one or more embodiments, processing unit 528 may be integrated as a single microprocessor. Thus, processing unit 528 may include a number of integrated components as located in the microprocessor. Such components may include, without limitation, the arithmetic logic unit (ALU), which performs simple arithmetic and logical operations. Processing unit 528 may also include a control unit (CU), which manages the various components of the unit, and also reads and interprets instructions from memory and transforms them into a series of signals to activate other parts of the unit. The control unit calls upon the arithmetic logic unit to perform the necessary calculations. Further, processing unit 528 may include the cache, which serves as high-speed memory where instructions can be copied to and retrieved. It is intended that processing unit 528 may function as a high speed processor for implementing instructions associated with the integrated components of mirror controller unit 504.

Further, mirror controller system 504 may be configured to include operating system 518. Operating system 518 is an operating system specifically designed to run software that manages hardware and software resources for processing unit 528. Operating system 518 allows a user to access and run other programs, such as applications (conventionally referred to as "apps" or "applications"), which may be displayed on touch screen 506.

In one or more embodiments, operating system 518 on mirror controller unit 504 may be implemented as an Android® based operating system. An Android® based operating system is a mobile operating system oftentimes used for mobile devices such as smartphones, tablets, PDA's, and other similar mobile devices. In alternative embodiments, operating system 518 may be any other operating system useful for operating mirror controller unit 504, including without limitation, iOS, which is the operating system used for Apple® based hardware. Depending on the type of operating system 518 implemented with mirror controller unit 504, a user may also have access to and may input commands in any number of applications associated with operating system 518.

Speakers 550 may refer to one or more speakers implemented as hardware in a body of mirror controller unit 504 so as to transmit any audio, i.e. sound, associated with any applications, GPS, or other programs associated with operating system 518 and processing unit 528.

Memory 522 may be a type of memory separate from the internal memory utilized by processing unit 528. In one or more embodiments, memory 522 may be an electronic non-volatile computer storage medium that can be electrically erased and reprogrammed. For example, in one or more embodiments, memory 522 may be a secure digital card (also known as "SD" card) that usually provides high capacity flash memory and may be implemented in a small size. In one or more embodiments, memory 522 may store any audiovisual data as recorded by audiovisual recorder 516. Memory 522 may further be used to store any data associated with applications operated on operating system 518.

In one or more embodiments, input/output ports 552 are included, which refer to any number of ports that may be included with mirror controller unit 504. In one or more embodiments, input/output ports 552 may be ports for a user to update any software associated any of the programs integrated with mirror controller unit 504, such as without limitation, operating system 518, GPS 512, and audiovisual recorder 516. Further, input/output ports 552 may provide access for a user to download data from these programs also to an external hard drive or computer. In one or more embodiments, mirror controller unit 504 may also be synched to update with an associated controller or other device.

Wireless transmitter 524 is included in mirror controller unit 504. The wireless transmitter 524 is a device for transmitting data wirelessly. The wireless transmitter 524 may be any type of device for transmission of data to a wireless adapted auxiliary device, such as, auxiliary vehicle warning device 538. The wireless system utilized by wireless transmitter 534 may include without limitation, a Bluetooth® wireless system, an infrared system, or a wireless local area networking system, commonly known as Wi-Fi. Bluetooth® and Wi-Fi as understood in the art are different standards for wireless communication between devices. In one or more embodiments, wireless transmitter 524 may be configured to transmit via Bluetooth® or Wi-Fi. In one or more embodiments, mirror controller unit 504 may include more than one wireless transmitter 524 suitable for transmitting either as Bluetooth® transmitter or a Wi-Fi enable transmitter. Bluetooth® may offer some advantages over Wi-Fi, including lower power consumption. Further, Bluetooth® has less interference issues than Wi-Fi and tends to transmit data signals over a short distance (for example, at least 10-30 feet).

In this embodiment, the wireless transmitter 524 transmits a wireless data signal 546 to a wireless auxiliary vehicle warning device 538 in response to receiving a user input from touch screen 506. Auxiliary vehicle warning device 538 includes a wireless receiver 542, which is adapted to receive the wireless data signal 546 from wireless transmitter associated with the mirror controller unit.

Set of control functions 540 are any control function or action that may be performed on auxiliary vehicle warning device 538. Mirror controller unit 504 may thus be used to operate various functions and features of associated auxiliary vehicle warning devices using wireless communication.

In one or more embodiments, mirror controller unit 504 may include wired connections also to auxiliary vehicle warning device 538 for operating a set of control functions 540. One of ordinary skill may connect wires between mirror controller unit 504 and auxiliary vehicle warning device 538 within the body and fabric of vehicle 502.

Further, in one or more embodiments, a set of selectors as located on a steering wheel of vehicle 502, seen as steering wheel 556 may be paired to operate with mirror controller unit 504 and transmit commands to auxiliary vehicle warning device 538. Accordingly, any input to selectors disposed on steering wheel 556 may be visual to a user on touch screen 506 and transmitted to operate a set of control functions 540 on auxiliary vehicle warning device 538.

It is considered a significant improvement over existing systems for a driver of a vehicle, such as vehicle 504, to control associated auxiliary vehicle warning devices using touch screen 506 integrated with a screen menu 514 for receiving user input commands. User may locate mirror controller unit 504 such that it is easily within reach of user within vehicle 502. Further, user may locate the mirror on an interior surface of a front windshield in one or more embodiments so that the mirror controller unit 504 operates as a rear view mirror as well as a control system for any wireless connected auxiliary vehicle warning devices. Additional advantages include the integration of GPS, via GPS 512, audiovisual recording capabilities through audiovisual recorder 516, and ability to see the rear view surroundings behind a vehicle using backup camera 548.

Figure 6:
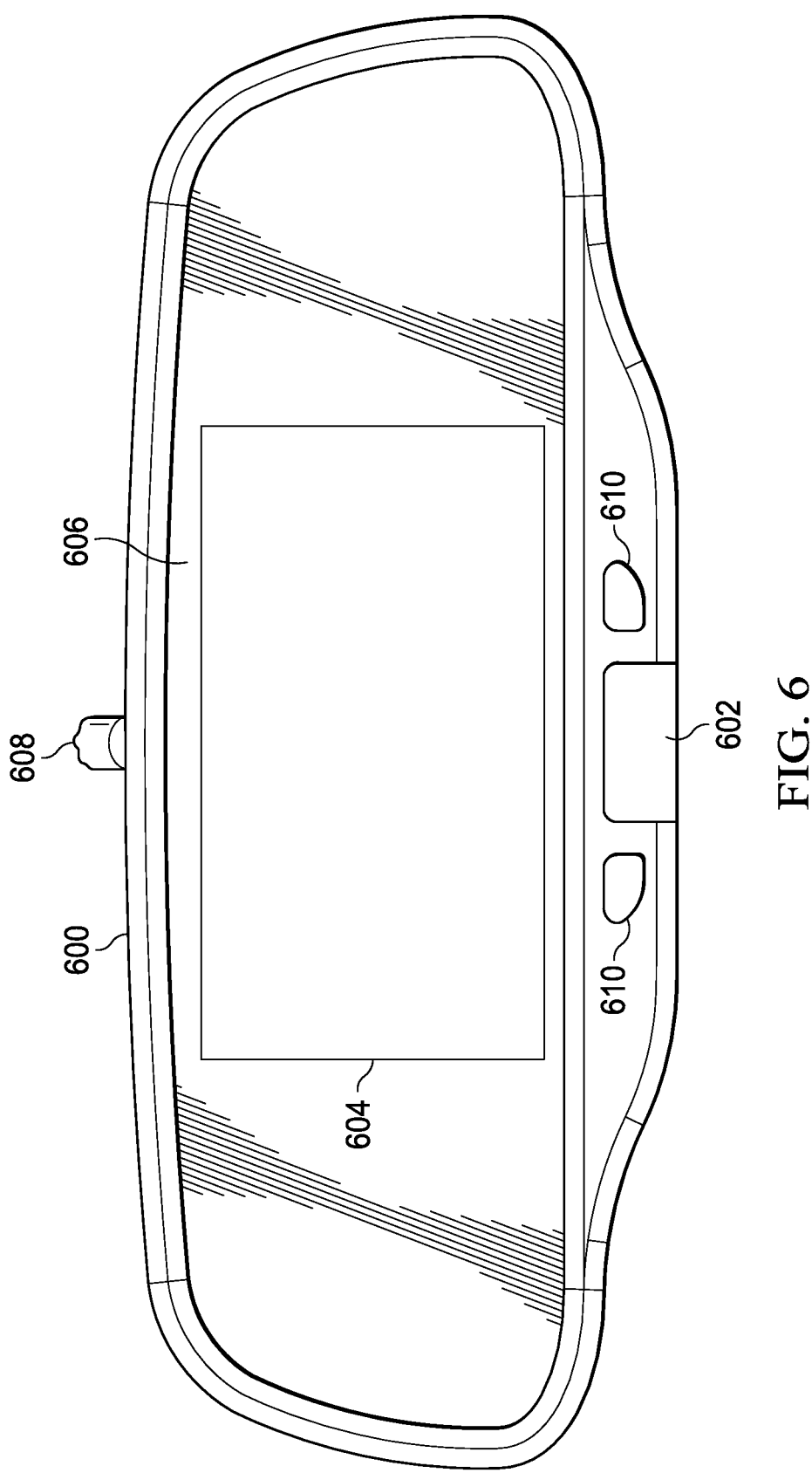
FIG. 6 illustrates a front side elevation view of a mirror controller unit with an integrated touch screen for use in a vehicle in accordance with illustrative embodiments described herein.

FIG. 6 shows a front side elevation view of a mirror controller unit with an integrated touch screen in accordance with an illustrative embodiment. Touch screen 604 may function in accordance with touch screen 506 as described in FIG. 5. Mirror controller unit 600 includes reflective mirror 606, which may extend over the entire width of mirror controller unit 600.

Touch screen 604 includes screen menu (not shown) for operating programs associated with touch screen 604, such as GPS, audio visual recordings, back up camera images, and viewing and running applications operating on an operating system associated with touch screen 604. FIG. 6 further shows selector 602 located on a bottom edge of mirror controller unit 600 which allows the unit to be activated or deactivated. Lights 610, pictured on either side of selector 602, may further visually indicate when mirror controller unit 600 is activated.

Figure 7:
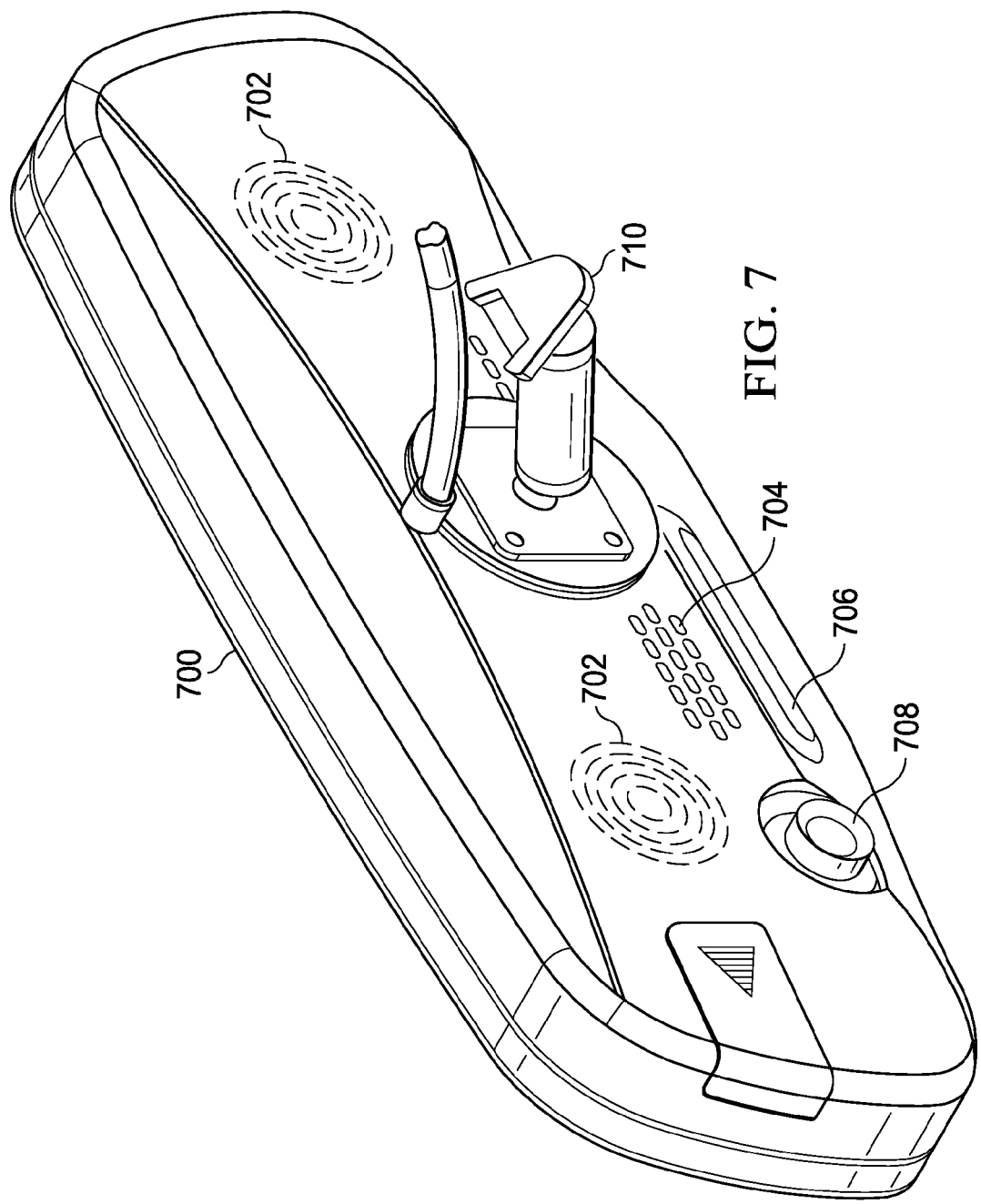
FIG. 7 illustrates a perspective view of the rear side of a mirror controller unit with an integrated touch screen in accordance with illustrative embodiments described herein.

Turning to FIG. 7, FIG. 7 provides a perspective view of the rear view of a mirror controller unit with an integrated touch screen in accordance with an illustrative embodiment. In one or more embodiments, mirror controller unit 700 is intended to function as mirror controller unit 504 as described in FIG. 5 and mirror controller unit 600 in FIG. 6.

Mirror controller unit 700 includes speakers 702 on either side of the unit to provide audio or sound associated with any of the programs operated on mirror controller unit 700. Further, mirror controller unit 700 includes heat dissipating holes 704 to dissipate any heat from an internal processing unit (not shown) integrated within mirror controller unit 700.

Audio visual recorder 708 is shown disposed in a recess of the rear body of mirror controller unit 700. Further, a slot for a memory device 706 is pictured in FIG. 7, whereby in FIG. 7, it is intended that memory device 706 may be a scan disk (SD) digital memory card for retrieving and storing data obtained from mirror controller unit 700.

Figure 8:
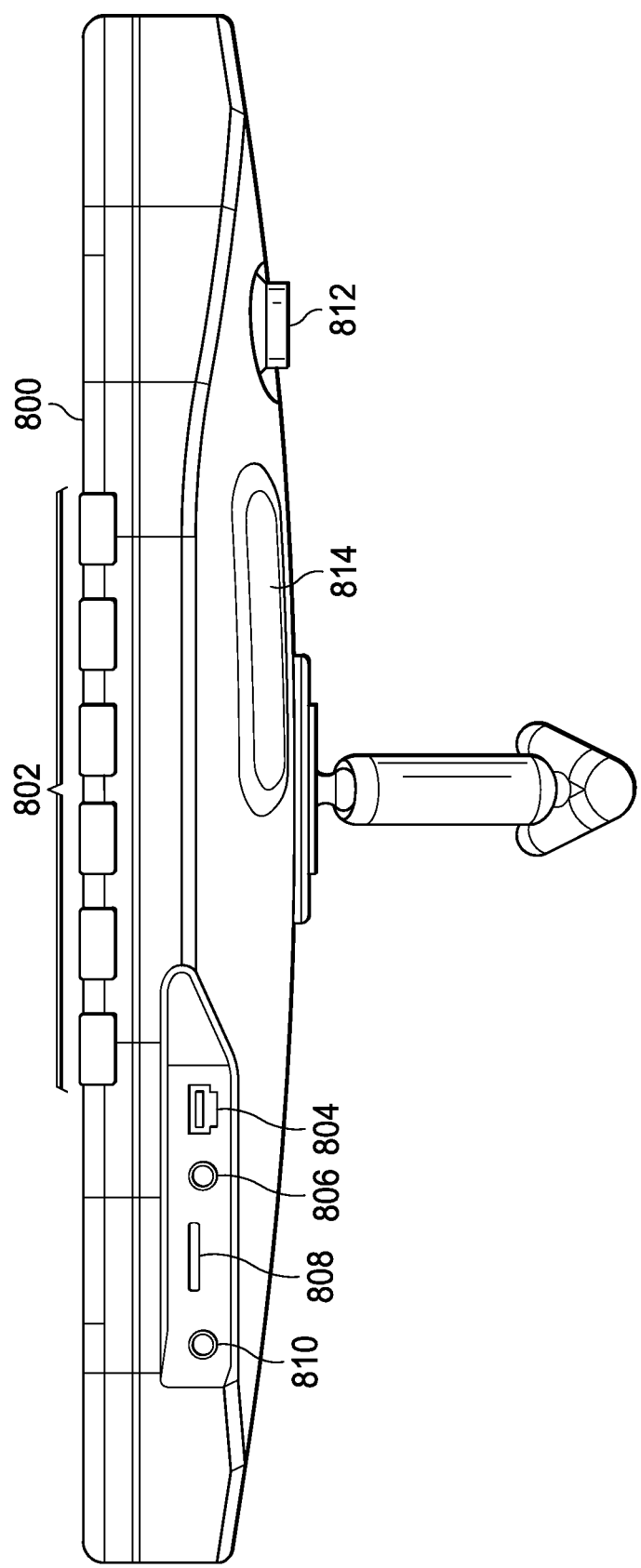
FIG. 8 illustrates a bottom side view of a mirror controller unit with an integrated touch screen in accordance with an illustrative embodiment.

Turning to FIG. 8, FIG. 8 illustrates a bottom elevation view of a mirror controller unit with an integrated touch screen. FIG. 8 shows a set of selectors 802 that may be included in one or more embodiments for further controlling control functions located on mirror controller unit 800 and/or an associated auxiliary vehicle warning device.

Mirror controller unit 800 further includes input/output ports 804, 806, 808, and 810 that provide access ports for various wires and connecting devices to be joined with mirror controller unit 800.

Figure 9:
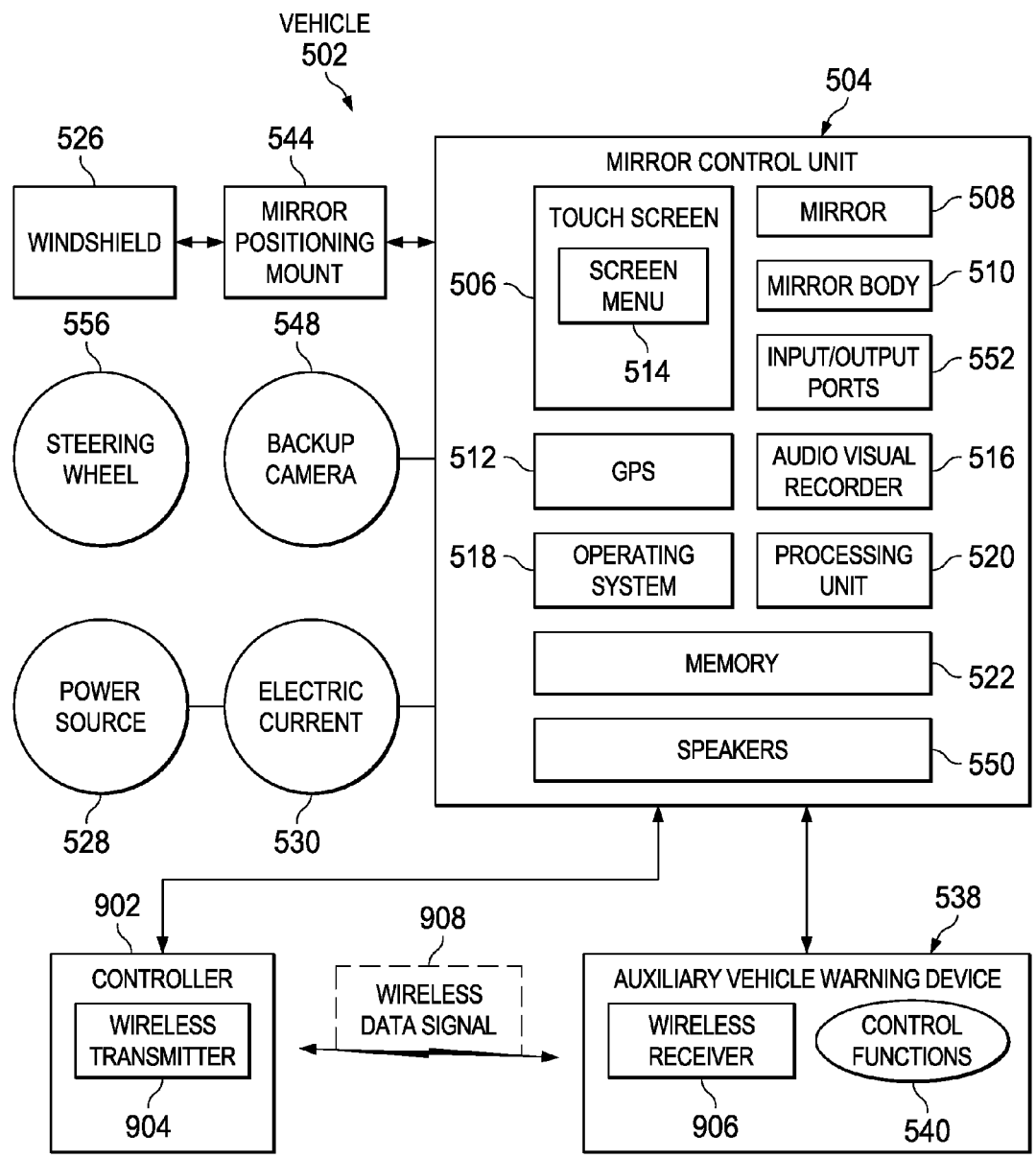
FIG. 9 illustrates a block diagram of a mirror controller unit with an integrated touch screen for controlling an auxiliary vehicle warning device in accordance with illustrative embodiments described herein.

FIG. 9 shows a block diagram of a mirror controller unit with an integrated touch screen in accordance with illustrative embodiments described herein. As shown in FIG. 9, like components of the mirror controller unit have been provided with the same reference numerals shown in FIG. 5. It is intended that the like components in FIG. 9 encompass the description included above in FIG. 5.

Further, in one or more embodiments, and as shown in FIG. 9, controller 902 is included in vehicle 502. Controller 902 may be a controller coupled to mirror controller unit 504. In one or more embodiments, controller 902 may include a wired connection to mirror controller unit 504. In alternative embodiments, controller 902 may communicate with mirror controller unit wirelessly, whereby mirror controller unit 504 includes a wireless receiver that is configured to receive wireless commands and/or instructions from controller 902.

Controller 902 is a control unit that is also coupled to auxiliary vehicle warning device 538. It is observed that oftentimes, vehicles, such as vehicle 502, may include an auxiliary vehicle warning device with a control unit or controller already attached and configured to operate in conjunction with the attached auxiliary vehicle warning device. For example, a vehicle may already include a control box that located somewhere on the console of the vehicle, whereby the control box has switches, knobs, or other selectors that when selected by a user, controls an output control function on the associated auxiliary vehicle warning device.

As shown in FIG. 9, in one or more embodiments, a user may use a controller 902 that is either attached in conjunction with mirror controller unit 504 or may already be existing and configured to control auxiliary vehicle warning device 538. The present invention provides for the ability to couple controller 902 to mirror controller unit 504, such that a user may also benefit from the features included with the mirror controller unit 504. Accordingly, controller 902 is coupled to mirror controller unit 504, which may be positioned on windshield 526 via mirror positioning mount 544.

In one or more embodiments, touch screen 506 may be used to display a virtual control box with the same appearance and arrangement of switches, knobs, and other selectors as seen on a physical control unit associated with an auxiliary vehicle warning device, such as controller 902. Accordingly, the look of controller 902 is simulated and provided to a user via touch screen 506. In such circumstances, a user may select an application or program from screen menu 514 associated with controller 902, and proceed to select the same switches, knobs, or other selectors as they appear on touch screen 506. This selection on touch screen 506 may be transmitted to controller 902, which in turn transmits the control function to auxiliary vehicle warning device 538. Accordingly, mirror control unit 506 may be utilized as a primary controller to control an associated auxiliary vehicle warning device, as shown in FIG. 5, or in alternative embodiments, may operate in conjunction with one or more additional controllers, such as controller 902 shown in FIG. 9.

In one or more embodiments, controller 902 includes wireless transmitter 904, and auxiliary vehicle warning device includes wireless receiver 906. The wireless transmitter 904 is a device for transmitting data wirelessly. The wireless transmitter 904 may be any type of device for transmission of data to a wireless adapted auxiliary device, such as, auxiliary vehicle warning device 538. The wireless system utilized by wireless transmitter 534 may include without limitation, a Bluetooth® wireless system, an infrared system, or a wireless local area networking system, commonly known as Wi-Fi. Bluetooth® and Wi-Fi as understood in the art are different standards for wireless communication between devices. In one or more embodiments, wireless transmitter 904 may be configured to transmit via Bluetooth® or Wi-Fi. In one or more embodiments, mirror controller unit 504 may include more than one wireless transmitter 904 suitable for transmitting either as Bluetooth® transmitter or a Wi-Fi enable transmitter. Bluetooth® may offer some advantages over Wi-Fi, including lower power consumption. Further, Bluetooth® has less interference issues than Wi-Fi and tends to transmit data signals over a short distance (for example, at least 10-30 feet).

In this embodiment, the wireless transmitter 904 transmits a wireless data signal 908 to a wireless auxiliary vehicle warning device 538 in response to receiving a user input from controller 902. Auxiliary vehicle warning device 538 includes a wireless receiver 906, which is adapted to receive the wireless data signal 908 from wireless transmitter 904 associated with the controller.

Figure 10:
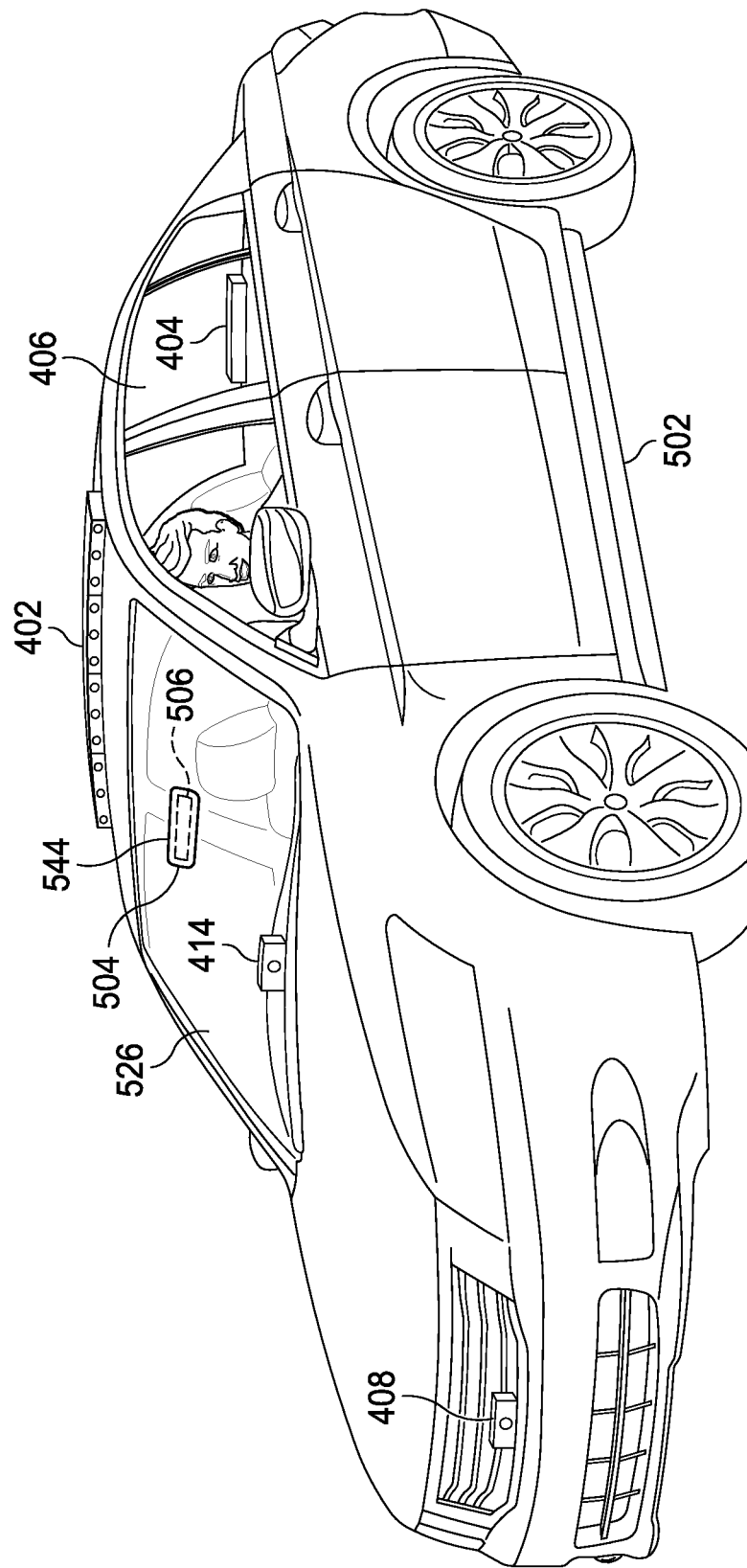
FIG. 10 illustrates a pictorial illustration of a vehicle with auxiliary vehicle warning devices and a mirror controller unit with an integrated touch screen in accordance with illustrative embodiments described herein.

Turning to FIG. 10, FIG. 10 is a pictorial illustration of a mirror controller unit with an integrated touch screen in accordance with illustrative embodiments described herein. In FIG. 10, mirror controller unit 504 includes a touch screen 506, as described above in FIG. 5 and further in FIG. 9. Mirror controller unit 504 as shown in FIG. 10 is configured to control one or more auxiliary vehicle warning devices, such as auxiliary vehicle warning device 402, 404, and 408. As described above, 402 may be an LED light bar, 404 may be a deck light, and 408 may be a grille light, which are known to one of ordinary skill in the art as being light emitting vehicle warning devices. FIG. 10 further shows that these auxiliary vehicle warning devices may be physically attached to an interior or exterior surface of vehicle 502, and may also be proximate to a front windshield 526 or a rear windshield 406. Those of ordinary skill in the art may understand that mirror controller unit 504 may include additional selectors on one or edges for controlling volume, activating or deactivating mirror controller unit 504, and other desirable control function associated with mirror controller unit 504.

Mirror controller unit 504 may be positioned to an interior surface of windshield 526 and conveniently positioned near enough to a driver of vehicle 502, so that the driver may reach over and operate mirror controller unit 504.

As shown in FIG. 10, for an operator of vehicle 502, to have a mirror controller unit 504 conveniently positioned proximate to him or her with touch screen 506 may enable the operator of vehicle 502 to quickly activate, deactivate, and select control functions associated with the associated auxiliary vehicle warning devices. In the emergency vehicle industry, such as with police, fire, ambulance vehicles, it is important to be able to quickly and effectively communicate to the public using the warning lights and sounds associated with their associated vehicle warning lights and sirens.

It is an intended objective of the present invention that a mirror controller unit is provided. In one embodiment, mirror controller unit includes a set of selectors for manually operating and performing a set of control functions on an associated auxiliary vehicle warning device. In another embodiment, the mirror controller unit includes a touch screen for receiving user input. The mirror controller unit with a touch screen may further include an operating system that displays applications useful to a user of the controller unit. Further, the mirror controller unit may provide additional technological features such as GPS and audiovisual recording. By locating such functions in a mirror that is readily accessible to a user, it is intended that an alternative location be offered to a user for controlling associated auxiliary vehicle warning devices. It is further intended to minimize the need to drill into a body of a vehicle.

The detailed description of the illustrative embodiments above is described in sufficient detail to enable those skilled in the art to practice the invention. To avoid unnecessary detail, the description may have omitted certain information known to those skilled in the art.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. Any feature that is described in connection to any one embodiment may also be applicable to any other embodiment. It is also understood that other embodiments may be utilized and that logical structural, mechanical, and chemical changes may be made without departing from the spirit or scope of the invention.

What is claimed is:

1. A mirror unit for use in a vehicle, the mirror unit comprising:
   a mirror body disposed on a mirror positioning mount, wherein the mirror positioning mount is configured to be coupled to a front windshield of the vehicle on an interior surface of the front windshield;
   a reflective mirror surface coupled to the mirror body;
   a set of selectors, wherein the set of selectors are located on at least one edge of the mirror body, wherein the set of selectors are configured to relay input regarding a set of control functions to one or more emergency vehicle warning devices, wherein the one or more emergency vehicle warning devices are configured to be physically attached to a surface of the vehicle, wherein the one or more emergency vehicle warning devices comprise visual and acoustic emergency warning devices;
   one or more connecting cables configured to connect the mirror unit to the one or more emergency vehicle warning devices, wherein the one or more emergency vehicle warning devices are separate from the mirror unit; and
   a processing unit, wherein the processing unit is located internally within the mirror body, and further wherein the processing unit is coupled to the set of selectors, wherein the processing unit is configured to communicate input from the set of selectors to the one or more emergency vehicle warning devices.

2. The mirror unit of claim 1, wherein the set of selectors may be configured to perform different control functions on the one or more emergency vehicle warning devices, wherein the one or more emergency vehicle warning devices are coupled to the vehicle at one or more locations on the vehicle.

3. The mirror unit of claim 1, wherein the set of control functions include changing a strobe pattern of a set of lights associated with the one or more emergency vehicle warning devices, changing a luminosity of the set of lights, changing a frequency of flashing of one or more lights in the set of lights, and changing a color pattern of the set of lights of the one or more emergency vehicle warning devices.

4. The mirror unit of claim 1, wherein the visual emergency warning devices include any one of a LED dash light, a LED visor light, an interior LED light bar, an exterior LED light bar, a license plate LED warning light, a LED grill light, a hideaway LED light, a LED beacon, a LED vehicle flasher, a warning LED light, or a deck LED light.

5. The mirror unit of claim 1, wherein the one or more emergency vehicle warning devices includes a siren, and further wherein the set of control functions include activating or deactivating the siren to produce a siren tone.

6. The mirror unit of claim 1, wherein the processing unit is coupled to a set of relays.

\* \* \* \* \*